United States Patent
Christmas et al.

(10) Patent No.: US 11,568,462 B1
(45) Date of Patent: Jan. 31, 2023

(54) COMPUTER-BASED SYSTEM FOR PRODUCT INITIATION

(71) Applicant: Wells Fargo Bank, N.A., San Francisco, CA (US)

(72) Inventors: Brenda Sue Christmas, Fountain Hills, AZ (US); Narayanan Ganapathy Iyer, Gilbert, AZ (US); Praveen Kesani, San Ramon, CA (US); Narendra Raje Urs Vidya Mysore, Fremont, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 184 days.

(21) Appl. No.: 17/165,455

(22) Filed: Feb. 2, 2021

(51) Int. Cl.
| | |
|---|---|
| G06Q 30/06 | (2012.01) |
| G06Q 10/10 | (2012.01) |
| G06Q 40/02 | (2012.01) |
| G06F 16/23 | (2019.01) |
| G06Q 30/00 | (2012.01) |

(52) U.S. Cl.
CPC ..... *G06Q 30/0613* (2013.01); *G06Q 30/0601* (2013.01); *G06Q 30/0633* (2013.01); *G06F 16/2379* (2019.01); *G06Q 10/10* (2013.01); *G06Q 30/016* (2013.01); *G06Q 30/018* (2013.01); *G06Q 40/02* (2013.01)

(58) Field of Classification Search
CPC .......... G06Q 30/0601; G06Q 30/0613; G06Q 30/0633
USPC ............................................. 705/26.1, 26.41
See application file for complete search history.

(56) References Cited

U.S. PATENT DOCUMENTS 8,046,238 B2 * 10/2011 Solomon ................ G06Q 40/12
  705/30
9,318,108 B2    4/2016 Gruber et al.
(Continued)

FOREIGN PATENT DOCUMENTS

CN    1667631 A  *  9/2005  ............. G06Q 30/02
FR    2961324 A1    12/2011
(Continued)

OTHER PUBLICATIONS

Article, "Artificial Life Announces Business Strategy 2000"; PR Newswire [New York] Feb. 18, 2000: Retrieved from Dialog database on Sep. 13, 2022 (Year: 2000).*

(Continued)

*Primary Examiner* — Yogesh C Garg
(74) *Attorney, Agent, or Firm* — Shumaker & Sieffert, P.A.

(57) ABSTRACT

A method comprises receiving, by a computing device, a selection of at least one product to initiate for a customer, determining, by executing a first bot, a product initiation system compatible with a second format and configured to initiate the at least one product, and retrieving, via the first bot, the customer information from a set of previously collected customer information within a product selection form stored in a first format. The method further includes enqueuing, via first bot, the customer information in a workflow queue, and providing, via at least one second bot, the customer information to the product initiation system in the second format, the at least one second bot being associated with the at least one product. The method further includes receiving, from the product initiation system, a notification indicating whether the at least one product has been initiated.

20 Claims, 5 Drawing Sheets

(56) References Cited

U.S. PATENT DOCUMENTS

| | | | |
|---|---|---|---|
| 11,086,614 B1* | 8/2021 | Jain | G06F 9/4881 |
| 11,238,526 B1* | 2/2022 | Le Chevalier | G06F 16/9535 |
| 2009/0158278 A1* | 6/2009 | De-Kay | H04L 67/564 |
| | | | 718/100 |
| 2013/0054327 A1* | 2/2013 | Ross | G06Q 30/02 |
| | | | 705/14.17 |
| 2017/0270431 A1* | 9/2017 | Hosabettu | G06F 9/4881 |
| 2019/0171845 A1 | 6/2019 | Dotan-Cohen et al. | |
| 2019/0253431 A1 | 8/2019 | Atanda | |

FOREIGN PATENT DOCUMENTS

| | | | | |
|---|---|---|---|---|
| JP | 2008021202 A | * | 1/2008 | G06Q 10/00 |
| KR | 20140123265 A | * | 10/2014 | G06Q 40/02 |

OTHER PUBLICATIONS

"Meet KAI: The Digital Experience Platform Created to Master the Language of Banking and Finance." Retrieved from https://kasisto.com/kai/, 2020, 5 pp. (Applicant points out, in accordance with MPEP 609.04(a), that the year of publication, 2020, is sufficiently earlier than the effective U.S. filing date, so that the particular month of publication is not in issue.)

"Self-Service: A Modern Competitive Advantage", Retrieved from https://www.progress.com/nativechat, 2020, 4 pp. (Applicant points out, in accordance with MPEP 609.04(a), that the year of publication, 2020, is sufficiently earlier than he effective U.S. filing date, so that the particular month of publication is not in issue.)

* cited by examiner

COMPUTER-BASED SYSTEM FOR PRODUCT INITIATION

TECHNICAL FIELD

The disclosure relates to computing devices executing software applications.

BACKGROUND

Individuals or users may sign up and/or apply to be a customer with an organization via an electronic application process where the customer electronically provides customer information to the organization and selects one or more products. Often, the individual is required to provide additional information, beyond the information provided to sign up and/or apply, based on the product and/or product type selected.

SUMMARY

In general, this disclosure describes a computer-based system for automatically providing previously collected customer information to a product initiation system to enroll the customer in one or more products. More specifically, the computer-based system is configured to translate, replicate, and/or output the previously collected customer information from an electronic customer information data source storing the customer information in a first format to the product initiation system requiring the customer information in a second format that is incompatible with the first format to initiate one or more selected product. The computer-based system may execute one or more software applications that can automatically translate and replicate the customer information, e.g., one or more software bots, such as an internet or web robots (referred to herein as "bots"). The computer-based system described herein enables automatic initiation of products based on the previously collected customer information that would otherwise require the time and attention of human operators and customer to separately collect the same customer information for each of the products. The techniques may provide for a simplified product initialization process and improved customer experience.

The computer-based system may comprise one or more computing devices associated with an organization, such as a financial institution, a bank, a business, or a government organization. In some examples, a bot may retrieve customer information from a streamlined form that is configured to gather customer information necessary for each of the one or more products, and within which the computer-based system may prepopulate at least one required customer information data field with default information based on customer identity and/or predicted customer information. For example, the computer-based system may execute a prediction algorithm and/or machine learning algorithm to predict at least one customer information data field required for at least one product based on at least one other customer information data field provided to the streamlined form, and a bot may retrieve the predicted customer information from the streamlined form and translate and replicate the predicted customer information to one or more of the products.

In one example, this disclosure describes a method includes receiving, by a computing device, a selection of at least one product to initiate for a customer; determining, by the computing device executing a first bot, a product initiation system configured to initiate the at least one product, wherein the product initiation system is compatible with a second format; retrieving, by the computing device executing the first bot, customer information from a set of previously collected customer information within a product selection form based on the selected at least one product, wherein the set of previously collected customer information is stored in a first format; enqueuing, by the computing device executing the first bot, the customer information in a workflow queue; providing, by the computing device executing at least one second bot, the customer information to the product initiation system in the second format, wherein the at least one second bot is associated with the at least one product; and receiving, by the computing device from the product initiation system, a notification indicating whether the at least one product has been initiated.

In another example, this disclosure describes a system includes a memory; and one or more processors in communication with the memory, the one or more processors configured to: receive a selection of at least one product to initiate for a customer; determine, by executing a first bot, a product initiation system configured to initiate the at least one product, wherein the product initiation system is compatible with a second format; retrieve, by executing the first bot, customer information from a set of previously collected customer information within a product selection form based on the selected at least one product, wherein the set of previously collected customer information is stored in a first format; enqueue, by executing the first bot, the customer information in a workflow queue; provide, by executing at least one second bot, the customer information to the product initiation system in the second format, wherein the at least one second bot is associated with the at least one product; and receive, from the product initiation system, a notification indicating whether the at least one product has been initiated.

In another example, this disclosure describes a computer readable medium comprising instructions that when executed cause one or more processors to: receive a selection of at least one product to initiate for a customer; determine, by executing a first bot, a product initiation system configured to initiate the at least one product, wherein the product initiation system is compatible with a second format; retrieve, by executing the first bot, customer information from a set of previously collected customer information within a product selection form based on the selected at least one product, wherein the set of previously collected customer information is stored in a first format; enqueue, by executing the first bot, the customer information in a workflow queue; provide, by executing at least one second bot, the customer information to the product initiation system in the second format, wherein the at least one second bot is associated with the at least one product; and receive, from the product initiation system, a notification indicating whether the at least one product has been initiated.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
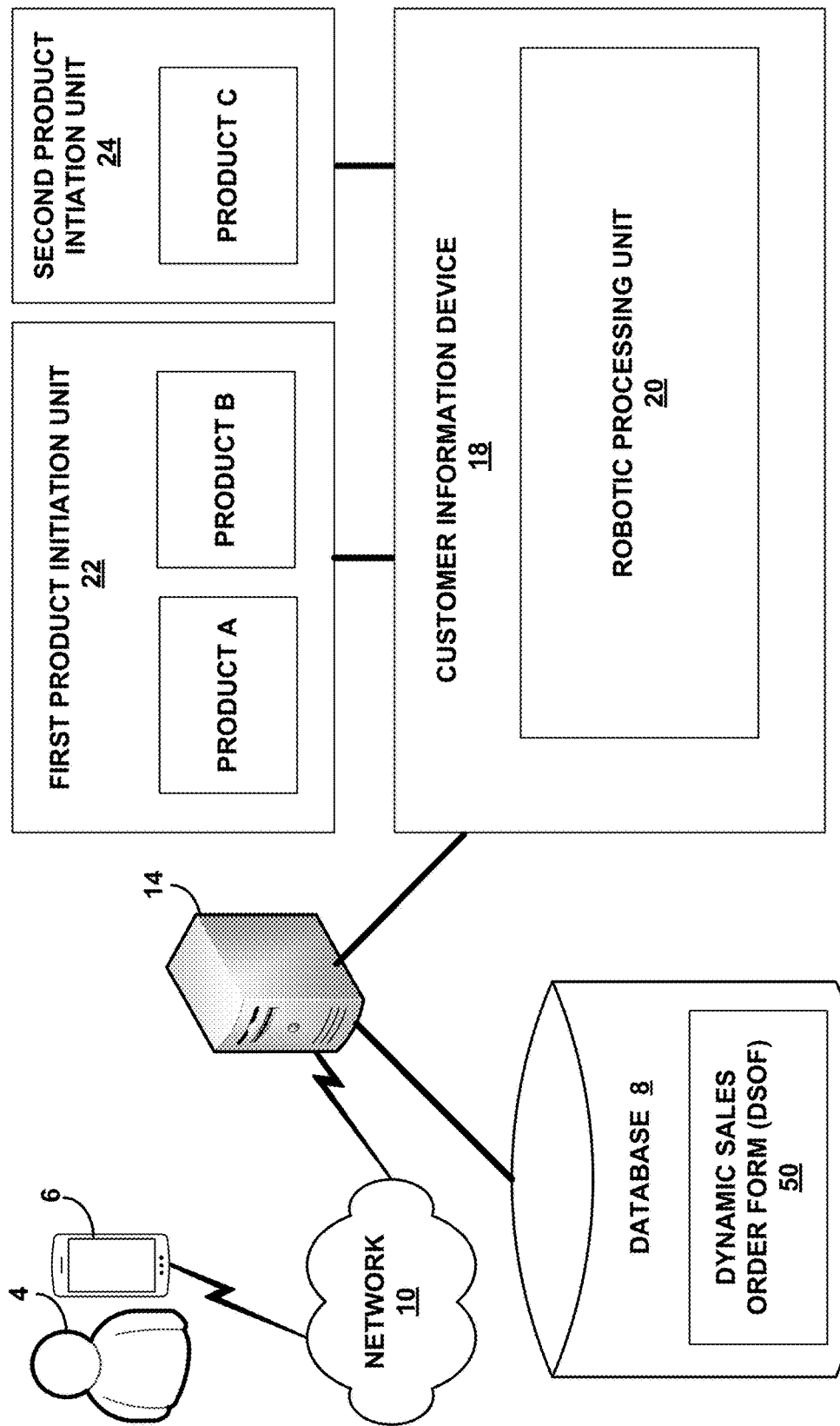
FIG. 1 is a block diagram illustrating an example computer-based system for product initiation, in accordance with the techniques of this disclosure.

The present disclosure describes a computer-based system for translating, replicating, and/or outputting customer information from an electronic customer information data source storing the customer information in a first format to a product initiation system requiring the customer information in a second format that is incompatible with the first format to initiate a selected product. The computer-based system may execute one or more software applications or bots that can automatically translate and replicate the customer information. The techniques enable automatic initiation of products that require customer information that would otherwise require the time and attention of a human operator. The techniques may provide for a simplified product initialization process and improved customer experience.

Customers may select, sign up for, and/or apply for one or more products that require customer information. For example, customers may sign up for one or more banking products and or financial products, e.g., any facilities or services related to cash management, including treasury, depository, overdraft, credit or debit card, purchase card, electronic funds transfer, other cash management arrangements, investments and securities. In some examples, the customer information may be collected and/or received as a plurality of customer information data points at different times. In some examples, a customer may select and apply for products sequentially, e.g., one-by-one. The customer information data points are often gathered via customer questions at the time of the selection of one or more products, and the number of data points and questions to be answered can become large, e.g., 500 or more questions and data points, and can be time consuming and frustrating.

Additionally, once a customer has selected one or more products and the customer information data points have been collected, different selected products may be associated with, and initiated by, different groups within the organization. In some examples, the different selected products may be initiated by different systems which may store, process, and use the customer information data points in differing formats, in which case the different systems may not be able to share previously provided or predicted customer information data points. For example, a first system associated with a first product selected by a customer may collect and use a first set of customer information data points to initiate the first product. The customer may then subsequently select a second product associated with a second system, which may need one or more of the customer information data points of the first set of customer information data points, and the customer may need to provide some of the same customer information data points a second time if the first and second systems are not able to share customer information data points. Additionally, the second system may not be able to predict further customer information data points that it otherwise would have been able to if it did have access to one or more of the customer information data points already collected by the first system.

In some examples of the present disclosure, a computer-based system may reduce the number of questions needed during customer information data point gathering. For example, the computer-based system may gather a reduced set of customer information data points and questions via a streamlined form, such as a dynamic sales order form (DSOF) in which one or more customer information data points may be automatically set using default customer information. In some examples, the computer-based system may determine the default customer information based on the customer identity and/or the type of customer and/or other customer information data points. In some examples, the computer-based system may determine the default customer information values based on predicted customer information via executing a prediction algorithm and/or machine learning to predict customer information.

In some examples, one or more bots may retrieve the customer information from the streamlined form and translate and replicate the customer information to one or more products. For example, a loader bot may retrieve customer information data points from a DSOF and output the customer information data points to a product initiation queue. In some examples, the loader bot may retrieve and output customer information via messaging, e.g., a JavaScript Object Notation (JSON) message. In some examples, the loader bot may extract, translate, convert, etc., the customer information from a specified format compatible with the DSOF to a different format, e.g., an XML, format, and output the customer information to the product initiation queue in the different format. In some examples, one or more product bots each associated with one or more products and product systems may retrieve the customer information from the product initiation queue, extract, translate, and/or convert the customer information from the different format to a specified format compatible with a product initiation unit and/or system for each respective product. The one or more product bots may output the customer information in the specified format compatible with the product initiation unit and/or system to complete initiation of the product for the customer.

FIG. 1 is a block diagram illustrating an example computer-based system 2 for product initiation, in accordance with the techniques of this disclosure. As illustrated in FIG. 1, system 2 includes an electronic product initiation task device 20, first and second product initiation systems 22, 24, and a server 14 that may communicate via network 10.

In some examples, network 10 may comprise a public network, such as the Internet. Although illustrated as a single entity, network 10 may comprise a combination of public and/or private networks. In some examples, network 10 may comprise one or more of a wide area network (WAN) (e.g., the Internet), a local area network (LAN), a virtual private network (VPN), or another wired or wireless communication network.

In some examples, first and second product initiation systems 22, 24 may include one or more products requiring customer information in order to initiate each product. In the example shown, first product initiation system 22 includes product A and product B, and second product initiation system 24 includes product C. First and second product initiation systems 22, 24, may be configured to initiate their respective products A-C based on a customer selection of the respective product and customer information. Products A-C may require customer information in order to be initiated, e.g., customer information that may be input into and/or retrieved by dynamic sales order form 50. In some examples, products A-C may require at least some of the same customer information, however, first and second product initiation units 22, 24 may not be configured to communicate with each other or may use differing formats and may not be able to share customer information. For example, second product initiation system 24 product C may require at least one customer information data point required by one or both of products A and product B, but second product initiation system 24 may not be in communication with, nor use the same customer information format, as first product initiation system 22.

Server 14 may be configured to gather, collect, and/or compile customer information and customer product selections from one or more user devices 6. A user or customer 4 may select one or more products and input customer information via one or more user devices 6, which may output the product selections and customer information via an electronic connection to server 14. User device 6 may be any type of computing and/or communication device, including but not limited to a mobile phone, a computer, a computing terminal, a laptop, a server, a phone, and the like. In some examples, customer 4 may be an individual or a natural person, or customer 4 may be an organization and interactions between customer 4 and server 14 may be carried out by one or more representatives, e.g., individuals authorized to represent customer 4 in selecting products and providing customer 4 information in order to initiate the selected products.

In some examples, server 14 may include and/or be configured to communicate with customer information device 18. Customer information device 18 may comprise a computing device configured to execute robotic processing unit 20 and maintain the dynamic sales order form (DSOF) 50. Customer information device 18 may be configured to receive a selection of at least one product. For example, user 4 may select one or more products via a user interface of an application executed by user device 6. User device 6 may then connect and communicate the selection(s) to customer information device 18 via network 14. In some examples, customer information device 18 may be configured to determine a product initiation system that is configured to initiate the one or more selected products. For example, customer information device 18 may determine which of first product initiation system 22 and/or second product initiation system 24 may initiate the one or more selected products. By way of example, if user 4 selects product A, customer information device 18 may determine that product initiation system 22 may initiate the selected product A for the customer.

Robotic processing unit 20 may be configured to send and receive customer information to/from a database 8 and product initiation units, e.g., first and second product initiation units 22, 24. In some examples, robotic processing unit 20 may be configured to retrieve a product selection and customer information in a specified format from database 8, e.g., stored in DSOF 50, determine a product initiation system configured to initiate the selected product, provide the customer information to the determined product initiation system in a second format, and receive a notification, e.g., from the product initiation system, as to whether the selected product was initiated.

For example, customer 4 may open/execute an application on user device 6 configured to communicate with server 14 via network 10. The application may be configured to display and/or emulate DSOF 50, which may provide one or more product options to customer 4 via a user interface of mobile device 6. Customer 4 may select one or more products to be initiated, e.g., a treasury product or treasury management product, a commercial banking product, and the like. Customer 4 may then be prompted by the application to provide customer information required in order to initiate the selected products, e.g., name, address, identification information, account and/or routing numbers, taxpayer identification numbers, or any other information suitable for initiating the one or more selected products. For example, customer 4 may select product A and product C and provide the relevant customer information for each product "within" DSOF 50. For example, customer 4 may provide customer information by entering customer information into one or more customer information data fields of DSOF 50.

In some examples, one or more representatives, e.g., individuals authorized to represent customer 4 in selecting products and providing customer 4 information in order to initiate the selected products and/or authorized to represent an organization and/or entity utilizing computer-based system 2, may open/execute an application on a device such as user device 6 or any suitable device configured to communicate with server 14 via network 10. The application may be configured to display and/or emulate DSOF 50, which may provide one or more product options to the one or more representatives via a user interface. The one or more representatives may select one or more products to be initiated (at the direction of customer 4), e.g., a treasury product or treasury management product, a commercial banking product, and the like. The one or more representatives may then be prompted by the application to provide customer information required in order to initiate the selected products, e.g., name, address, identification information, account and/or routing numbers, taxpayer identification numbers, or any other information suitable for initiating the one or more selected products (which may be provided to the one or more representatives by customer 4). For example, one or more representatives may select product A and product C and provide the relevant customer information for each product "within" DSOF 50. For example, one or more representatives may provide customer information by entering customer information into one or more customer information data fields of DSOF 50.

DSOF 50 may be configured to store product selections and customer information in a specified format, e.g., a JSON format, an XML, format, or any other suitable format. In some examples, computer-based system 2 may include a plurality of product initiation units and/or systems which may use a plurality of differing formats, and DSOF 50 may be an information repository for one or more customers 4 in a standardized format from which information may be pulled and reformatted for use with each product initiation unit and/or system. In some examples, product initiation units and/or systems may generate additional customer information, e.g., a new identification or account number associated with a new product, and customer information device 18 may reformat the new customer information into the standardized format and store the new customer information in DSOF 50. In some examples, DSOF 50 may be configured to generate additional and/or new customer information, e.g., based on previously collected customer information. For example, DSOF 50 may be configured to generate default customer information based on previously collected customer information.

The application executing on user device 6 may send the product A and product C selections and the associated customer information to server 14 via network 10, which may parse and send the selections and customer information to database 8 to be stored in DSOF 50 stored in database 8. Customer information device 18, being executed by, or in communication with, server 14 may retrieve the product A and product C selections and associated customer information from DSOF 50. In some examples, DSOF 50 may be configured to package and push product selections and associated customer information in one or more messages, e.g., JSON messages, to one or more message queues. In some examples, customer information device 18 may be configured to retrieve/pull product selections and associated customer information from DSOF 50 and package the product selections and associated customer information in one or more messages and push the one or more messages to one more work queues. For example, DSOF 50 may create and/or compile a JSON message for product A including a unique identifier denoting the product selection of customer 4 and the associated customer information required for initiating product A and push the product A JSON message to a message queue. Additionally, DSOF 50 may create a JSON message for product C including a unique identifier denoting the product selection of customer 4 and the associated customer information required for initiating product C and push the product C JSON message to a message queue. Robotic processing unit 20 may be configured to be "listening for" and/or to retrieve JSON messages, e.g., based on the unique identifier of the JSON messages, and may retrieve the product A and product C JSON messages. Robotic processing unit 20 may determine that first product initiation unit 22 may be configured to initiate product A, and may translate, reformat, or otherwise provide the product A JSON message in a second format compatible with first product initiation unit 22. Similarly, robotic processing unit 20 may determine that second product initiation unit 24 may be configured to initiate product C, and may translate, reformat, or otherwise provide the product C JSON message in a third format compatible with second product initiation unit 24.

Robotic processing unit 20 may be configured to receive messages from product initiation units. For example, robotic processing unit 20 may receive a notification from first product initiation unit 22 indicating whether product A has been initiated and may receive a notification from second product initiation unit 24 indicating whether product C has been initiated. In some examples, robotic processing unit 20 may receive a confirmation of initiation message, e.g., a message from first and second product initiation units 22, 24 that products A and product C were successfully initiated. In some examples, robotic processing unit 20 may receive an exception message from one or both of first and second product initiation units 22, 24 including an indication that one or both of products A, C were not successfully initiated and one of an error code or a reason why one or both of products A, C were not initiated. In some examples, robotic processing unit 20 may receive the indication in the second and/or third formats, respectively, e.g., the format corresponding to first and second product initiation units 22, 24, as to whether products A, C were initiated. Robotic processing unit 20 may output a message in the first format with the indication, e.g., the confirmation and/or exception message to DSOF 50. In some examples, robotic processing unit 20 and/or customer information device 18 may cause the output message, e.g., confirmation and/or exception, to be output to user device 6.

Figure 2:
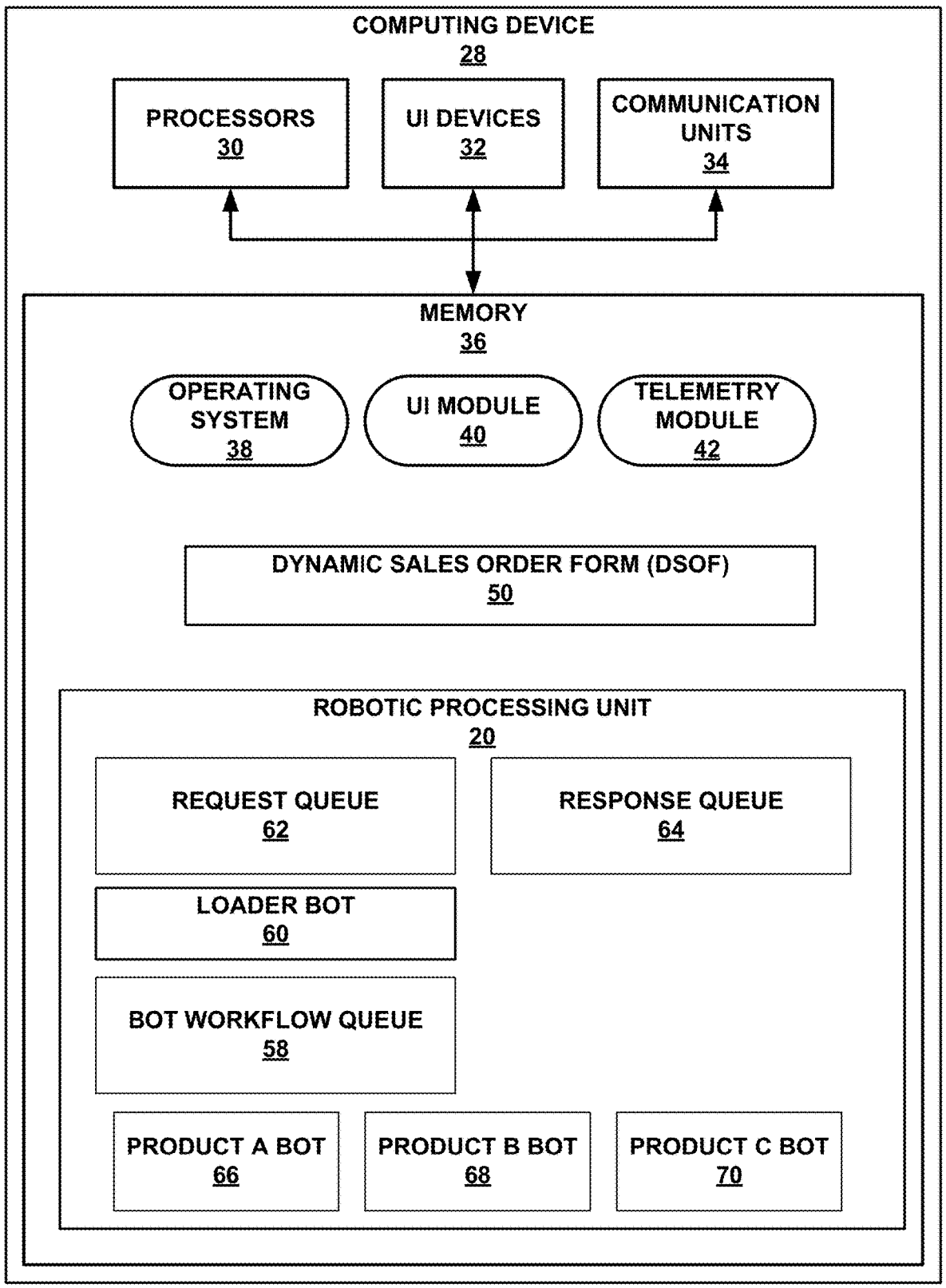
FIG. 2 is a block diagram illustrating an example computing device configured to execute a customer information replication bot, in accordance with the techniques of this disclosure.

FIG. 2 is a block diagram illustrating an example computing device 28 configured to execute a customer information replication bot, in accordance with the techniques of this disclosure. Computing device 28 may be an example of server 14 of FIG. 1 or customer information device 18 of FIG. 1, which may be included within or in communication with server 14. The architecture of computing device 28 illustrated in FIG. 2 is shown for exemplary purposes only and computing device 28 should not be limited to this architecture. In other examples, computing device 28 may be configured in a variety of ways.

As shown in the example of FIG. 2, computing device 28 includes one or more processors 30, one or more user interface (UI) devices 32, one or more communication units 34, and one or more memory units 36. Memory 36 of computing device 28 includes operating system 38, UI module 40, telemetry module 42, DSOF 50, and robotic processing unit 20, which are executable by processors 30. Each of the components, units or modules of computing device 28 are coupled (physically, communicatively, and/or operatively) using communication channels for inter-component communications. In some examples, the communication channels may include a system bus, a network connection, an inter-process communication data structure, or any other method for communicating data. Processors 30, in one example, may comprise one or more processors that are configured to implement functionality and/or process instructions for execution within computing device 28. For example, processors 30 may be capable of processing instructions stored by memory 36. Processors 30 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory 36 may be configured to store information within computing device 28 during operation. Memory 36 may include a computer-readable storage medium or computer-readable storage device. In some examples, memory 36 include one or more of a short-term memory or a long-term memory. Memory 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory 36 is used to store program instructions for execution by processors 30. Memory 36 may be used by software or applications running on computing device 28 (e.g., robotic processing unit 20) to temporarily store information during program execution.

Computing device 28 may utilize communication units 34 to communicate with external devices via one or more networks, e.g., network 10 from FIG. 1, or via wireless signals. Communication units 34 may be network interfaces, such as Ethernet interfaces, optical transceivers, radio frequency (RF) transceivers, or any other type of devices that can send and receive information. Other examples of interfaces may include Wi-Fi, NFC, or Bluetooth radios. In some examples, computing device 28 utilizes communication units 34 to wirelessly communicate with an external device, such as mobile device 6 and account database 8 illustrated in FIG. 1.

UI devices 32 may be configured to operate as both input devices and output devices. For example, UI devices 32 may be configured to receive tactile, audio, or visual input from a user of computing device 28. In addition to receiving input from a user, UI devices 32 may be configured to provide output to a user using tactile, audio, or video stimuli. In one example, UI devices 32 may be configured to output content such as a GUI for display at a display device. UI devices 32 may include a presence-sensitive display that displays a GUI and receives input from a user using capacitive, inductive, and/or optical detection at or near the presence sensitive display.

Other examples of UI devices 32 include a mouse, a keyboard, a voice responsive system, video camera, microphone or any other type of device for detecting a command from a user, or a sound card, a video graphics adapter card, or any other type of device for converting a signal into an appropriate form understandable to humans or machines. Additional examples UI devices 32 include a speaker, a cathode ray tube (CRT) monitor, a liquid crystal display (LCD), organic light emitting diode (OLED), or any other type of device that can generate intelligible output to a user.

Operating system 38 controls the operation of components of computing device 28. For example, operating system 38, in one example, facilitates the communication of UI module 40, telemetry module 42, and robotic processing unit 20 with processors 30, UI devices 32, communication units 34, and memory 36. UI module 40, telemetry module 42, and robotic processing unit 20 may each include program instructions and/or data stored in memory 36 that are executable by processors 30. For example, robotic processing unit 20 may include instructions that cause computing device 28 to perform one or more of the techniques described in this disclosure.

Computing device 28 may include additional components that, for clarity, are not shown in FIG. 2. For example, computing device 28 may include a battery to provide power to the components of computing device 28. Similarly, the components of computing device 28 shown in FIG. 2 may not be necessary in every example of computing device 28.

In the example illustrated in FIG. 2, robotic processing unit 20 includes loader bot 60, request queue 62, response queue 64, bot workflow queue 58 and product bots 66-70, e.g., product A bot 66, product B bot 68, and product C bot 70. In some examples, robotic processing unit 20 may be configured to automatically provide previously collected customer information to one or more product initiation systems to enroll the customer in one or more products, e.g., products selected by customer 4. Additionally, robotic processing unit 20 may be configured to retrieve and/or determine default customer information, e.g., based on previously provided customer information and/or other customer-related data, such as customer product use history and customer behavior. For example, robotic processing unit 20 may be configured to fill and/or populate one or more customer information data fields of DSOF 50 based on one or more other customer information data fields of one or more DSOF 50 stored in database 8, e.g., replicating the same customer information across a plurality of DSOF 50 data fields and/or generating new customer information via prediction based on previously provided customer information. In some examples, robotic processing unit 20 may be configured to receive a history of products customer 4 has applied for and used, a web browsing history, a shopping and/or purchasing history, a travel history, a credit history, and the like, and predict customer information via one or more prediction algorithms and/or machine learning. In some examples, robotic processing unit 20 may be configured to track product initiation progress and/or history, receive notification of confirmation of a successful product initiation, and receive notification of an unsuccessful product initiation and an exception, error code, and/or a reason for the product initiation failure, or the like.

Loader bot 60 may be configured to determine a product initiation system configured to initiate a product, e.g., first product initiation unit 22 or second product initiation unit 24. In some examples, loader bot 60 may be configured to receive and/or retrieve a selection, by customer 4, of a product to initiate. For example, loader bot 60 may be configured to detect and pull new product selections and the associated customer information from DSOF 50 and/or loader bot 60 may be configured to "listen" for a new product selection message to be posted in a message queue, e.g., request queue 62, the message posted by DSOF 50. For example, loader bot 60 may be configured to periodically access, or receive a notification from, DSOF 50 and determine if a new product selection has been entered into DSOF 50, and/or loader bot 60 may be configured to periodically access, or receive a notification from, request queue 62 and determine if a new product selection and/or a product selection message has been entered into request queue. In some examples, loader bot 60 and/or DSOF 50 may be configured to add a unique identifier associated with the selected product and/or customer 4 to the product selection message. In some examples, loader bot 60 may be configured to retrieve customer information from locations other than DSOF 50. For example, loader bot 60 may be configured to retrieve customer information from other already active products, other databases such as databases including bank accounts and/or credit accounts of customer 4, customer 4 public records, and/or any other suitable location of customer information.

Product bots 66-70 may each be configured to retrieve, receive, and/or dequeue the product selection message posted to request queue 62, e.g., based on the unique identifier. Product bots 66-70 may be configured to provide and/or output the customer information to the determined product initiation unit and/or system in the format compatible with the product initiation unit and/or system. For example, loader bot 60 may post a product initiation JSON message including a unique identifier associated with a selected product and/or customer 4 in bot workflow queue 58. One or more product bots 66-70 may "listen," e.g., detect the product initiation JSON message within the bot workflow queue 58, and may dequeue the product selection message from the bot workflow queue 58 based on the unique identifier for processing. In some examples, product bots 66-70 may translate and/or convert the product selection message and/or the information of the product selection message to a format compatible with a product association unit and/or system. For example, customer 4 may select product A and input customer information associated with product A into DSOF 50. Loader bot 60 may create and/or compile a product initiation message for product A for customer 4 including a unique identifier associated with product A and/or customer 4 and post the product selection message to bot workflow queue 58. Product bots 66-70 may detect the product selection message posted to bot workflow queue 58, and product A bot 66 may dequeue the product selection message from bot workflow queue 58, retrieve the data associated with the produce selection message, and convert the format of the product selection message to a format compatible with product initiation unit 22. Product B bot 68 and product C bot 70 may do nothing, since the unique identifier associates the product selection message with product A. Product A bot 66 may be configured to then output and/or provide the product selection message to product initiation unit 22 in the format compatible with product initiation unit 22.

Product bots 66-70 may each be configured to receive a notification, e.g., from the product initiation system, as to whether the selected product was initiated. In some examples, product bots 66-70 may be configured to receive a notification of confirming a successful product initiation and/or to receive a notification of an unsuccessful product initiation and an exception, error code, and/or a reason for the product initiation failure, or the like. For example, product initiation unit 22 may output a notification confirming successful product initiation of product A or product initiation unit 22 may output a notification of an unsuccessful product initiation of product A and an exception, error code, and/or a reason for the product initiation failure, and product bot A 66 may receive the notification. Product bot A may then output the notification to response queue 64 and/or DSOF 50.

In some examples, robotic processing unit 20 may be configured to send and receive customer information to/from a database 8 and product initiation units and/or systems for multiple product selections, e.g., multiple product selection messages. For example, loader bot 60 may post multiple product selection messages to bot workflow queue 58, and multiple product bots 66-70 may dequeue, retrieve, and process the multiple product request messages. In some examples, multiple product bots associated with the same product, e.g., two or more product A bots 66, may dequeue, retrieve, and process the multiple product request messages. In some examples, multiple product bots associated with the same or different products, e.g., two or more of any of product bots 66-70, may dequeue, retrieve, and process the multiple product request messages.

Figure 3:
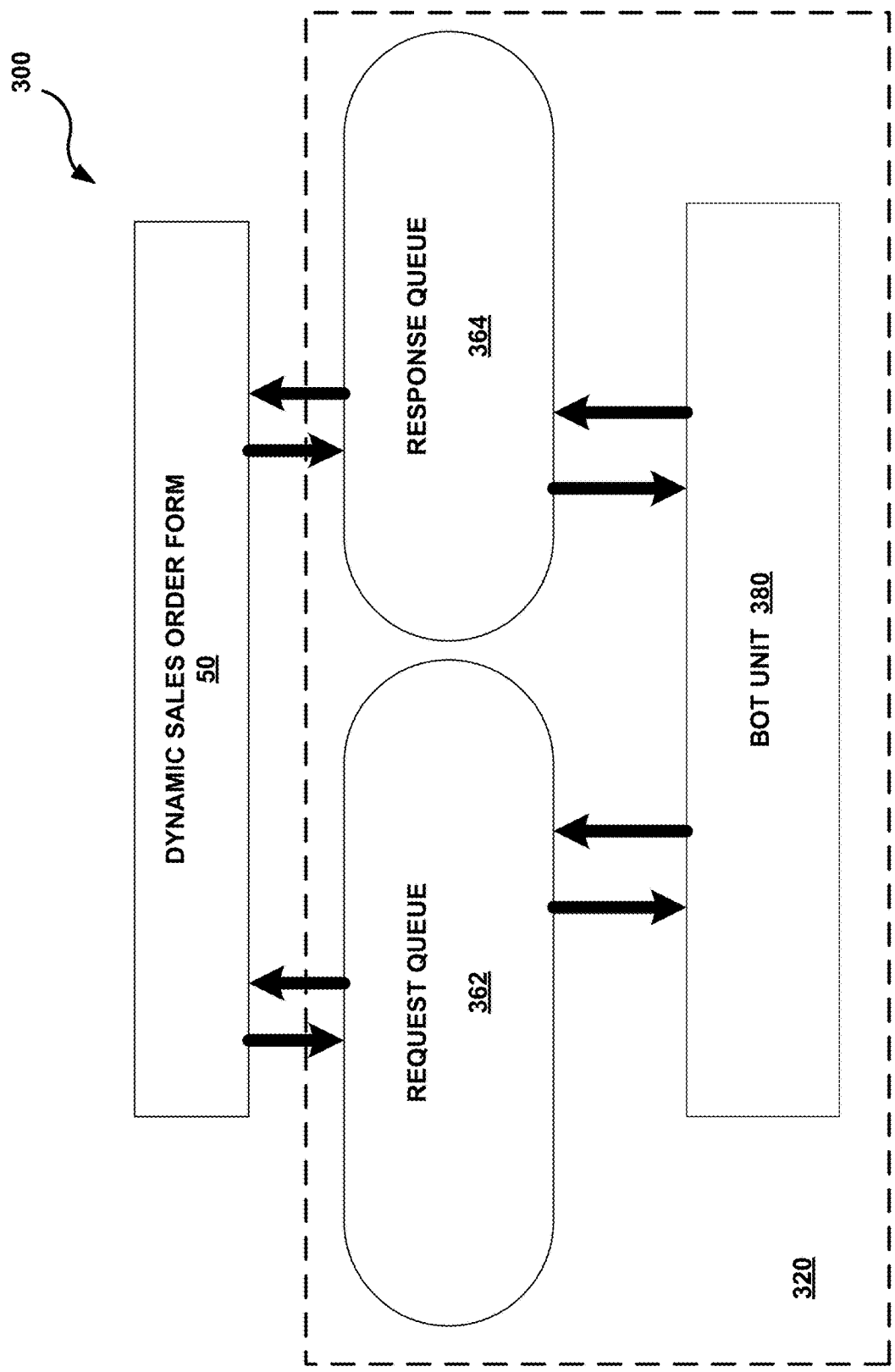
FIG. 3 is block diagram illustrating an example system for product initiation, in accordance with the techniques of this disclosure.

FIG. 3 is block diagram illustrating an example system 300 for product initiation, in accordance with the techniques of this disclosure. As illustrated in FIG. 3, system 300 includes DSOF 50 and a robotic processing unit 320. In some examples, system 300 may be substantially similar to computer-based system 2 or a portion of computer-based system 2 of FIG. 1. FIG. 3 illustrates one example of the enqueuing, dequeuing, and message flows of product initiation message requests and responses that may be used, for example, with system 300 and/or computer-based system 2.

Robotic processing unit 320 may be substantially similar to robotic processing unit 20 of FIG. 2. In the example shown, robotic processing unit 320 includes a request queue 362, a response queue 36, and one or more bot unit 380.

In the example shown, DSOF 50 may be configured to post messages to request queue 362. For example, DSOF 50 may be configured to post JSON messages including unique product identifiers and customer information required to initiate and/or set-up the requested product on a target system, e.g., any system configured to manage and/or maintain the product during the lifetime of the product, such as a computing system of an organization. DSOF 50 may also be configured to receive, retrieve, and/or pull messages from response queue 364, e.g., one or more JSON messages including a notification as to whether a product was successfully initiated or whether there was an exception, and any associated exception message, error code, or reason why the product was not successfully initiated.

Bot unit 380 may include one or more product bots, one or more loader bot, and at least one bot workflow queue, which may be substantially similar to product bots 66-70, loader bot 60, and bot workflow queue 58 of FIG. 2, respectively. In some examples, a loader bot of bot unit 380 may be configured to retrieve, receive, and/or pull messages from request queue 362, and in some examples, one or more individual product bots of bot unit 380 may be configured to retrieve, receive, and/or pull messages from request queue 362, e.g., without the use of a loader bot, in any of the ways described below. In the example shown, bot unit 380 may be configured to retrieve, receive, and/or pull messages from request queue 362. For example, bot unit 380 may be configured to "listen for," e.g., detect messages posted to request queue 362 and to determine one or more product bots suitable for processing the messages, e.g., based on a unique identifier associated with the product being requested. Bot unit 380 may be configured to convert the format of the messages to the formats compatible with product initiation systems and output the reformatted messages to the suitable product initiations systems to initiate the selected product of each message. Bot unit 380 may further be configured to receive a notification as to whether the products were successfully initiated, e.g., a confirmation of initiation message or an exception message which may include an error code or a reason why the at least one product was not initiated. Bot unit 380 may further be configured to post the notification to response queue 364.

Figure 4:
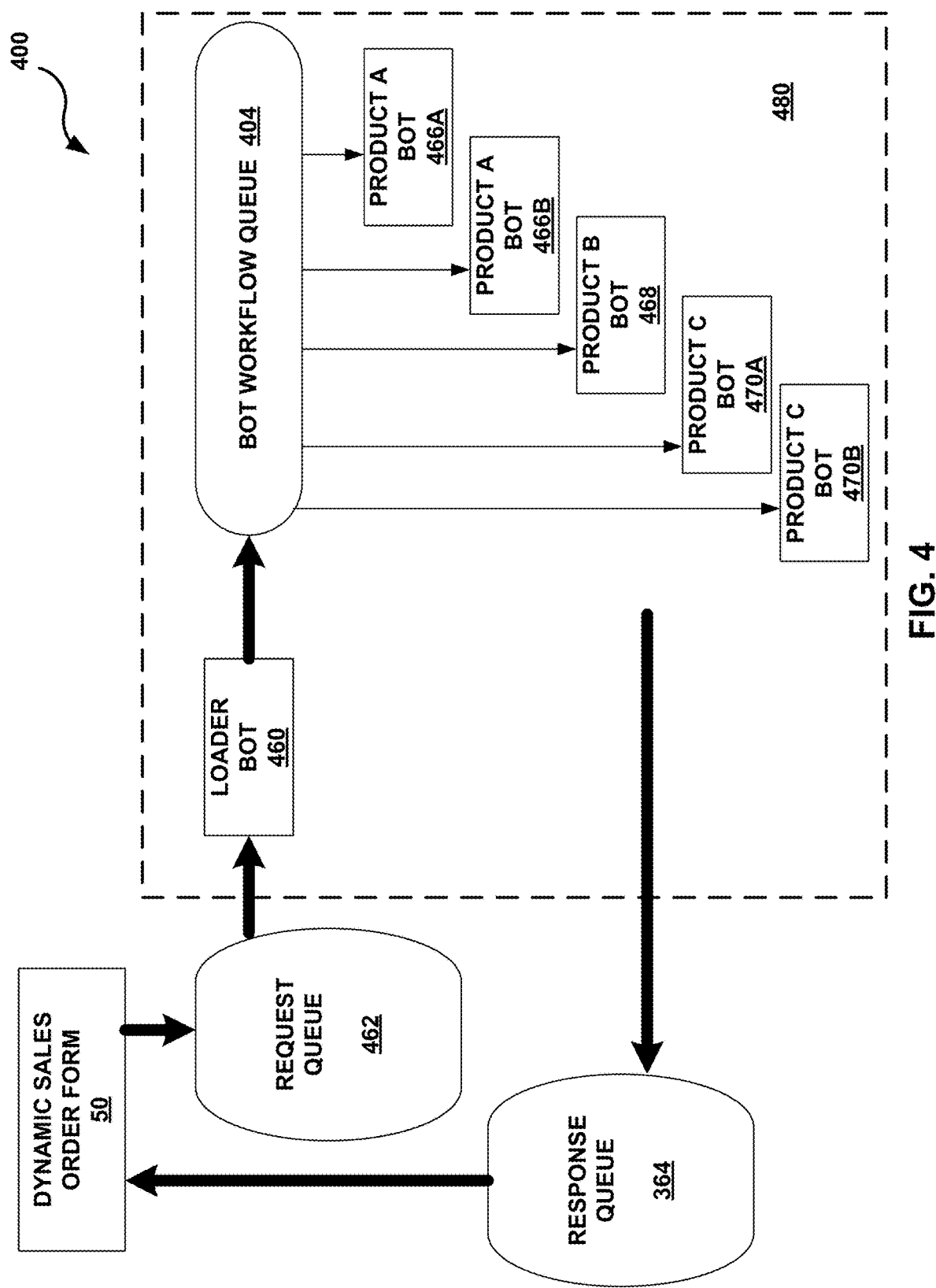
FIG. 4 is block diagram illustrating another example system for product initiation, in accordance with the techniques of this disclosure.

FIG. 4 is block diagram illustrating another example system 400 for product initiation, in accordance with the techniques of this disclosure. As illustrated in FIG. 4, system 400 includes DSOF 50, request queue 462, response queue 364, and bot unit 480 which may include loader bot 460, bot workflow queue 404, and product bots 466-470. In some examples, system 400 may be substantially similar to computer-based system 2 or a portion of computer-based system 2 of FIG. 1, and/or system 300 of FIG. 3, e.g., with the addition of loader bot 360 and bot workflow queue 404. In some examples, bot unit 480 may be a detailed illustration of bot unit 380 and may be substantially similar to bot unit 380 of FIG. 3. FIG. 4 illustrates one example of the enqueuing, dequeuing, and message flows of product initiation message requests and responses that may be used, for example, with system 400 and/or computer-based system 2.

In the example shown, DSOF 50 may be configured to post messages to request queue 462. In some examples, request queue 462 is substantially similar to request queue 362. For example, DSOF 50 may be configured to post JSON messages including unique product identifiers and customer information required to initiate and/or set-up the requested product on a target system, e.g., any system configured to manage and/or maintain the product during the lifetime of the product, such as a computing system of an organization. DSOF 50 may also be configured to receive, retrieve, and/or pull messages from response queue 364, e.g., one or more JSON messages including a notification as to whether a product was successfully initiated or whether there was an exception, and any associated exception message, error code, or reason why the product was not successfully initiated.

Loader bot 460 may be configured to retrieve, receive, and/or pull messages from request queue 462 and add the messages to bot workflow queue 404, e.g., periodically and/or upon determining that a new message was posted to request queue. In some examples, DSOF 50 may post one or more messages to request queue 462 without a unique identifier, and loader bot 460 may be configured to determine the appropriate product initiation unit and/or system and add the unique identifier associated with the product, customer 4, and in some examples, one or more of product bots 466-470 or a product initiation system.

Bot unit 480 may include one or more product bots 466-470, which may be substantially similar to product bots 66-70 of FIG. 2. In the example shown, product bots 466-470 may be configured to retrieve, receive, and/or pull messages from bot workflow queue 404. For example, product bots 466-470 may be configured to "listen for," e.g., detect messages posted to bot workflow queue 404 and to determine one or more product bots 466-470 suitable for processing the messages, e.g., based on a unique identifier associated with the product being requested. Product bots 466-470 may be configured to convert the format of the messages to the formats compatible with product initiation systems and output the reformatted messages to the suitable product initiations systems to initiate the selected product of each message. Product bots 466-470 may further be configured to receive a notification as to whether the products were successfully initiated, e.g., a confirmation of initiation message or an exception message which may include an error code or a reason why the at least one product was not initiated. Product bots 466-470 may further be configured to post the notification to response queue 364. In some examples, product bots 466-470 may be configured to post an "in progress" notification to response queue 364, e.g., upon request for a current status of product initiation and/or during the period of time in which the respective product is being initiated.

In some examples, product bots 466-470 may be configured to operate in parallel. For example, loader bot 460 may post a plurality of product request messages to bot workflow queue 404 associated with one or more products. For example, loader bot 460 may post two product request messages for a product A (e.g., for two instances of product A for customer 4 or for two instances of product A for different customers), one product request messages for product B, and two product request messages for a product C within a short period of time. Product A bot 466A may be configured to process one of the product request messages for product A, and product A bot 466B may be configured to process the other product request messages for product A in parallel. In some examples, product A bot 466B may be a replicate of product A bot 466A. Similarly, product C bot 470A may be configured to process one of the product request messages for product C, and product C bot 470B may be configured to process the other product request messages for product C in parallel, and product B bot 468 may be configured to process the product request message for product B in parallel as well. In some examples, product bots 466-470 may be configured to process product request messages sequentially rather than, or in addition to, being configured to process product request messages in parallel. In general, product bots 466-470 may include any number of replicate product bots configured to process product request messages in coordination with each other in parallel and/or sequentially.

Figure 5:
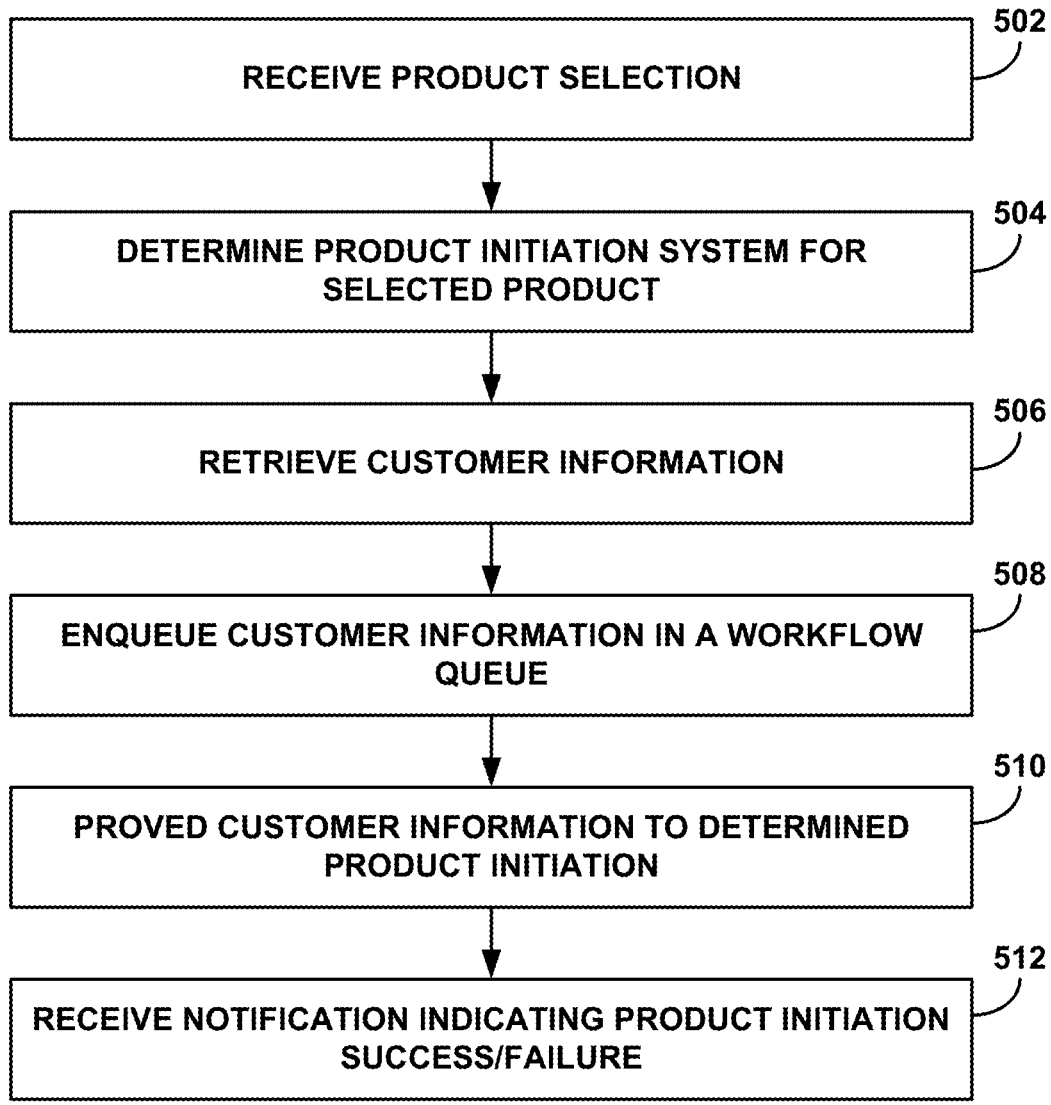
FIG. 5 is a flowchart illustrating an example method of initiating a product via a customer information replication bot, in accordance with the techniques of this disclosure.

FIG. 5 is a flowchart illustrating an example method of initiating a product via a customer information replication bot, in accordance with the techniques of this disclosure. Although FIG. 5 is discussed using computer-based system 2 of FIG. 1 and computing device 28 of FIG. 2, it is to be understood that the methods discussed herein may include and/or utilize other systems and methods in other examples.

Computing device 28 may receive a selection of at least one product to initiate for a customer (502). For example, customer 4 may select a product in DSOF 50 via user device 6, and customer 4 may further provide customer information needed to initiate the one or more selected products. Server 14 may receive the selections and customer information from user device 6 via network 10 and store the selections in DSOF 50 stored within database 8. Computing device 28, operating on or in communication with server 14, may retrieve and/or receive the product selections and associated customer information from DSOF 50, e.g., loader bot 60 may periodically pull product selections and the associated customer information from DSOF 50. In one example carried throughout the steps of the method, customer 4 may select product B and provide the customer information needed to initiate product B to DSOF 50.

Computing device 28 may determine a product initiation system configured to initiate the at least one product, the product initiation system being compatible with a specified format, e.g., a second format from the format of DSOF 50 (504). For example, loader bot 60 may be configured to determine the appropriate product initiation unit and/or system for initiating a selected product, e.g., based on the product being selected, and one or more information, data, and/or message formats compatible with the appropriate product initiation unit and/or system. In the example being carried through the method steps herein, loader bot 60 may determine that first product initiation unit 22 is the product initiation unit to initiate the selected product B of (502).

Computing device 28 may retrieve information from a set of previously collected customer information stored in a "first" format, e.g., a specified and/or standardized format, within DSOF 50 based on the selected product (506). For example, DSOF 50 may store information in a specified and/or standardized format for initiating a plurality of products by a plurality of product initiation units and/or systems. Loader bot 60 may retrieve and/or receive customer information associated with and/or required for initiating the selected product from DSOF 50 and may add a unique identifier to the product selection and associated customer information. For example, loader bot 60 may create and/or compile a JSON message including customer information and a unique identifier associated with the selected product and/or requesting customer 4. In the example being carried through the steps of the method, loader bot 60 may retrieve the customer information needed to initiate product B from DSOF 50 and compile a product B JSON message including the customer information and a unique identifier associated with product B and/or customer 4. In some examples, loader bot 60 may retrieve customer information from locations other than DSOF 50. For example, loader bot 60 may retrieve customer information from other already active products, other databases such as databases including bank accounts and/or credit accounts of customer 4, customer 4 public records, and/or any other suitable location of customer information.

Computing device 28 may enqueue the customer information in a workflow queue (508). For example, loader bot 60 may post the created/compiled product B JSON message to bot workflow queue 404.

Computing device 28 may provide the customer information to a product initiation system in the second format, e.g., the format compatible with the product initiation system (510). For example, one or more of product bots 66-70, 380, or 466-470 may detect the unique identifier and pull and/or dequeue the product initiation request JSON message from bot workflow queue 404 and translate, convert, and/or reformat the customer information from the standardized DSOF 50 format (e.g., the "first" format) to a format compatible with the product initiation unit and/or system determined at method step 504. In the example being carried through the steps of the method, product B bot 468 may pull the product B JSON message from bot workflow queue 404 based on the unique identifier and product B bot 468 being associated with product B, reformat the message to a JSON message in a format compatible with first product initiation unit 22, and provide and/or output the reformatted JSON message to product initiation unit 22.

Computing device 28 may receive a notification indicating whether the at least one product has been initiated (512). For example, one or more of product bots 66-70, 380, or 466-470 may receive a notification from the product initiation unit and/or system confirming that the product was initiated or a notification of an exception that the product was not initiated and any associated error codes and/or reasons why the product was not initiated. In the example being carried through the steps of the method, product B bot 468 may receive a confirmation of initiation message or an exception message from product initiation unit 22, and product B bot 468 may post the message and/or its contents to response queue 24 and/or 364.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a mobile computing device, a wearable computing device, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   receiving, by a computing device, a selection of at least one product to initiate for a customer;
   determining, by the computing device executing a first bot, a product initiation system configured to initiate the at least one product, wherein the product initiation system is compatible with a second format;
   retrieving, by the computing device executing the first bot, customer information from a set of previously collected customer information within a product selection form based on the selected at least one product, wherein the set of previously collected customer information is stored in a first format;
   enqueuing, by the computing device executing the first bot, the customer information in a workflow queue;
   providing, by the computing device executing at least one second bot, the customer information to the product initiation system in the second format, wherein the at least one second bot is associated with the at least one product; and
   receiving, by the computing device from the product initiation system, a notification indicating whether the at least one product has been initiated.

2. The method of claim 1, further comprising:
   receiving, by the computing device from a user via a user interface, customer information into one or more customer information data fields of the product selection form; and
   storing, by the computing device in the product selection form, the received customer information as part of the set of previously collected customer information in the first format.

3. The method of claim 1, further comprising:
- determining, by the computing system, default customer information based on the set of previously collected customer information; and
- storing, by the computing system, the default customer information in one or more customer information data fields of the product selection form as part of the set of previously collected customer information in the first format.

4. The method of claim 1, wherein the previously collected customer information is stored at one or more locations, wherein retrieving customer information based on the selected at least one product comprises:
- determining, via the computing device, the customer information required for initiation of the at least one product;
- determining, via the computing device executing the first bot, a location of the customer information based on a customer identity; and
- retrieving, by the computing device executing the first bot, the customer information from the location.

5. The method of claim 1, wherein enqueuing the customer information in the workflow queue comprises:
- compiling, by the computing system executing the first bot, the customer information into at least one message, the message including a unique identifier associated with the at least one product; and
- outputting, by the computing system executing the first bot, the at least one message to the workflow queue.

6. The method of claim 5, wherein providing the customer information to the product initiation system in the second format comprises:
- detecting, by the computing system executing the at least one second bot, the unique identifier of the at least one message within the workflow queue;
- dequeuing, by the computing system executing the at least one second bot, the at least one message based on the unique identifier associated with the at least one product for processing by the at least one second bot associated with the at least one product;
- translating, by the computing system executing the at least one second bot, the customer information to the second format from the first format, wherein the second format is different from the first format; and
- outputting the customer information in the second format to the product initiation system.

7. The method of claim 5, wherein the message comprises a JavaScript Object Notation (JSON) message.

8. The method of claim 1, wherein receiving a notification indicating whether the at least one product has been initiated comprises receiving, by the computing system executing the at least one second bot, one of:
- a confirmation of initiation message; or
- an exception message, wherein the exception message comprises an indication that the at least one product was not initiated and one of an error code or a reason why the at least one product was not initiated.

9. The method of claim 1, wherein the selection of the at least one product comprises a first selection of a first product, and wherein the product initiation system comprises a first product initiation system configured to initiate the first product, the method further comprising:
- receiving a second selection of a second product to initiate for the customer;
- determining, by the computing device executing the first bot, a second product initiation system configured to initiate the second product, wherein the second product initiation system is compatible with a third format;
- retrieving, by the computing device executing the first bot, customer information from the set of previously collected customer information within the product selection form based on the selected second product, wherein the set of previously collected customer information is stored in the first format;
- enqueuing, by the computing device executing the first bot, the customer information in the workflow queue;
- providing, by the computing device executing a third bot, the customer information to the second product initiation system in the third format; and
- receiving, by the computing device from the second product initiation system, a second notification indicating whether the second product has been initiated.

10. A system comprising:
a memory; and
one or more processors in communication with the memory, the one or more processors configured to:
- receive a selection of at least one product to initiate for a customer;
- determine, by executing a first bot, a product initiation system configured to initiate the at least one product, wherein the product initiation system is compatible with a second format;
- retrieve, by executing the first bot, customer information from a set of previously collected customer information within a product selection form based on the selected at least one product, wherein the set of previously collected customer information is stored in a first format;
- enqueue, by executing the first bot, the customer information in a workflow queue;
- provide, by executing at least one second bot, the customer information to the product initiation system in the second format, wherein the at least one second bot is associated with the at least one product; and
- receive, from the product initiation system, a notification indicating whether the at least one product has been initiated.

11. The system of claim 10, wherein the one or more processors are further configured to:
- receive, from a user via a user interface, customer information into one or more customer information data fields of the product selection form; and
- store, in the product selection form, the received customer information as part of the set of previously collected customer information in the first format.

12. The system of claim 10, wherein the one or more processors are further configured to:
- determine default customer information based on the set of previously collected customer information; and
- store, the default customer information in one or more customer information data fields of the product selection form as part of the set of previously collected customer information in the first format.

13. The system of claim 10, wherein the previously collected customer information is stored at one or more locations, wherein to retrieve customer information based on the selected at least one product, the one or more processors are further configured to:
- determine the customer information required for initiation of the at least one product;
- determine, via executing the first bot, a location of the customer information based on a customer identity; and retrieve, by executing the first bot, the customer information from the location.

14. The system of claim 10, wherein to enqueue the customer information in the workflow queue, the one or more processors are further configured to:
    compile, by executing the first bot, the customer information into at least one message, the message including a unique identifier associated with the at least one product; and
    output, by executing the first bot, the at least one message to the workflow queue.

15. The system of claim 14, wherein to provide the customer information to the product initiation system in the second format, the one or more processors are further configured to:
    detect, by executing the at least one second bot, the unique identifier of the at least one message within the workflow queue;
    dequeue, by executing the at least one second bot, the at least one message based on the unique identifier associated with the at least one product for processing by the at least one second bot associated with the at least one product;
    translate, by executing the at least one second bot, the customer information to the second format from the first format, wherein the second format is different from the first format; and
    output the customer information in the second format to the product initiation system.

16. The system of claim 14, wherein the message comprises a JavaScript Object Notation (JSON) message.

17. The system of claim 10, wherein to receive a notification indicating whether the at least one product has been initiated, the one or more processors are further configured to:
    receiving, by executing the at least one second bot, one of a confirmation of initiation message or an exception message, wherein the exception message comprises an indication that the at least one product was not initiated and one of an error code or a reason why the at least one product was not initiated.

18. The system of claim 10, wherein the selection of the at least one product comprises a first selection of a first product, wherein the product initiation system comprises a first product initiation system configured to initiate the first product, and wherein the one or more processors are further configured to:
    receive a second selection of a second product to initiate for the customer;
    determine, by executing the first bot, a second product initiation system configured to initiate the second product, wherein the second product initiation system is compatible with a third format;
    retrieve, by executing the first bot, customer information from the set of previously collected customer information within the product selection form based on the selected second product, wherein the set of previously collected customer information is stored in the first format;
    enqueue, by executing the first bot, the customer information in the workflow queue;
    provide, by executing a third bot, the customer information to the second product initiation system in the third format; and
    receive, from the second product initiation system, a second notification indicating whether the second product has been initiated.

19. A non-transitory computer readable medium comprising instructions that when executed cause one or more processors to:
    receive a selection of at least one product to initiate for a customer;
    determine, by executing a first bot, a product initiation system configured to initiate the at least one product, wherein the product initiation system is compatible with a second format;
    retrieve, by executing the first bot, customer information from a set of previously collected customer information within a product selection form based on the selected at least one product, wherein the set of previously collected customer information is stored in a first format;
    enqueue, by executing the first bot, the customer information in a workflow queue;
    provide, by executing at least one second bot, the customer information to the product initiation system in the second format, wherein the at least one second bot is associated with the at least one product; and
    receive, from the product initiation system, a notification indicating whether the at least one product has been initiated.

20. The non-transitory computer readable medium of claim 19 further comprising instructions that when executed cause one or more processors to:
    compile, by executing the first bot, the customer information into at least one message, the message including a unique identifier associated with the at least one product;
    output, by executing the first bot, the at least one message to the workflow queue;
    detect, by executing the at least one second bot, the unique identifier of the at least one message within the workflow queue;
    dequeue, by executing the at least one second bot, the at least one message based on the unique identifier associated with the at least one product for processing by the at least one second bot associated with the at least one product;
    translate, by executing the at least one second bot, the customer information to the second format from the first format, wherein the second format is different from the first format; and
    output the customer information in the second format to the product initiation system.

* * * * *